United States Patent
Zheng et al.

(10) Patent No.: US 9,496,701 B2
(45) Date of Patent: Nov. 15, 2016

(54) POWER SUPPLY FUSE ALARM CIRCUIT AND ALARM APPARATUS

(71) Applicant: Huawei Technologies Co., Ltd., Shenzhen, Guangdong (CN)

(72) Inventors: Yangwei Zheng, Wuhan (CN); Changwei Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 166 days.

(21) Appl. No.: 14/310,928

(22) Filed: Jun. 20, 2014

(65) Prior Publication Data

US 2014/0376143 A1 Dec. 25, 2014

(30) Foreign Application Priority Data

Jun. 20, 2013 (CN) .......................... 2013 1 0246393

(51) Int. Cl.
*H02H 5/00* (2006.01)
*H02H 3/04* (2006.01)

(52) U.S. Cl.
CPC .................... *H02H 3/046* (2013.01)

(58) Field of Classification Search
CPC .................................................... H02H 3/046
See application file for complete search history.

(56) References Cited

U.S. PATENT DOCUMENTS

| | | |
|---|---|---|
| 5,986,557 A | 11/1999 | Clarke |
| 2008/0130418 A1 | 6/2008 | Clervoy |
| 2012/0280821 A1 | 11/2012 | Coffey et al. |

FOREIGN PATENT DOCUMENTS

| | | |
|---|---|---|
| CN | 2406429 Y | 11/2000 |
| CN | 101040228 A | 9/2007 |
| CN | 201717621 U | 1/2011 |

OTHER PUBLICATIONS

Bon Pipkin, "ATT-TP-76450 Common Systems Equipment Interconnection Standards for the ATT Local Exchange Companies and AT&T Corporation", Oct. 15, 2010, 36 pages.

*Primary Examiner* — Thienvu Tran
*Assistant Examiner* — Tien Mai (57) ABSTRACT

The present invention provides a power supply fuse alarm circuit and an alarm apparatus, where the alarm circuit is connected to a power access module of multiple combined paths and includes multiple groups of alarm units, and each of the alarm units includes: a voltage step-down module, which performs step-down processing on a voltage provided by the power access module, to output a working voltage applicable to the alarm circuit; a control module, which outputs a pulse control signal with a certain duty cycle in a case of normal power supply; a power consumption module, which generates an alarm blowing current according to the pulse control signal, so that the alarm blowing current serves as a virtual load to blow an alarm fuse by using the alarm blowing current after a main fuse is blown; and a protection module, which disconnects the power consumption module after a control circuit fails.

22 Claims, 5 Drawing Sheets

FIG. 1

(PRIOR ART)

POWER SUPPLY FUSE ALARM CIRCUIT AND ALARM APPARATUS

CROSS-REFERENCE TO RELATED APPLICATION

This application claims priority to Chinese Patent Application No. 201310246393.X, filed on Jun. 20, 2013, which is hereby incorporated by reference in its entirety.

TECHNICAL FIELD

The present invention belongs to the communications field, and in particular, relates to a power supply fuse alarm circuit and an alarm apparatus.

BACKGROUND

A power supply loop is set in a cabinet in an equipment room in the telecom industry, and an alarm requirement is imposed on the power supply loop. Currently, a majority of operators in North America such as AT&T, Verizon, Quest, and TWC adopt an alarm fuse, and require that the alarm fuse can display an alarm after a main fuse is blown in a dual-combined-path power supply scenario, which is the "AT&T TP76450/76200 (Issue13/Issue15a 2010.10 latest version)" standard. Therefore, it is unavoidable for equipment providers in the North America market to solve an alarm fuse problem in a dual-combined-path power supply scenario.

Figure 1:
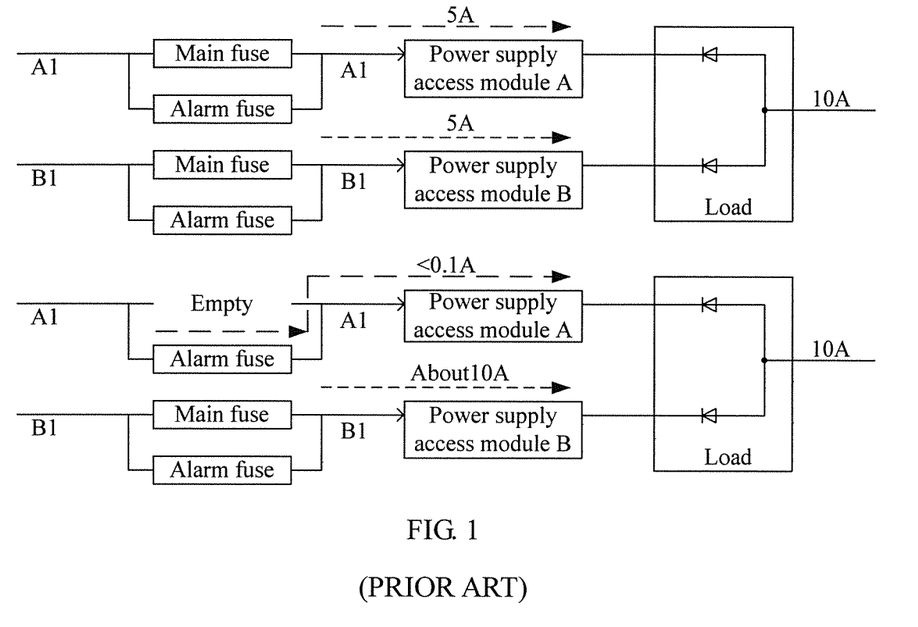
FIG. 1 is a schematic structural diagram of an existing fuse alarm circuit before and after a main fuse is blown.

However, an existing fuse alarm circuit is mainly designed for a single-path power supply. All fuse vendors can enable an alarm fuse to be blown to indicate an alarm after a main fuse is blown. However, in a dual-combined-path power supply scenario, if fuses (a main fuse and an alarm fuse) are directly connected to a load by using power access modules (power access module A and power access module B), as shown in FIG. 1, because impedance of the main fuse and impedance of the alarm fuse are not at the same order of magnitude, after the main fuse in one path (A1) is blown (Empty), only a small part of device current (such as a 5 A current) passes through the alarm fuse, and a most part of the device current passes through the main fuse in another path (B1). Consequently, a current in the main fuse in B1 approaches 10 A, and only a current that is approximately less than 0.1 A passes through the alarm fuse in A1. As a result, after the main fuse is blown, no alarm prompt is provided because the alarm fuse cannot be blown, which seriously affects reliability of running of a power supply loop.

SUMMARY

An objective of embodiments of the present invention is to provide a power supply fuse alarm circuit, so as to solve a problem that an existing fuse alarm circuit cannot provide an alarm prompt in a multiple-combined-path scenario.

The embodiments of the present invention are implemented in the following way: A power supply fuse alarm circuit includes multiple groups of alarm units, a forward input end and a reverse input end of each of the alarm units are connected to a power access module of multiple combined paths, and each of the alarm units includes:

a voltage step-down module, where a forward input end of the voltage step-down module is the forward input end of the alarm unit and is connected to a forward power supply provided by the power access module, and a reverse input end of the voltage step-down module is the reverse input end of the alarm unit and is connected to a reverse power supply provided by the power access module; and the voltage step-down module is configured to perform step-down processing on a voltage provided by the power access module, to output a working voltage applicable to the alarm circuit;

a control module, where a power supply end of the control module is connected to an output end of the voltage step-down module, and the control module is configured to output a pulse control signal with a certain duty cycle in a case of normal power supply;

a power consumption module, where a first power supply end of the power consumption module is connected to the output end of the voltage step-down module, a second power supply end of the power consumption module is connected to the forward power supply provided by the power access module, and a control end of the power consumption module is connected to an output end of the control module; and the power consumption module is configured to generate an alarm blowing current according to the pulse control signal, so that the alarm blowing current serves as a virtual load to blow an alarm fuse by using the alarm blowing current after a main fuse is blown; and a protection module, where one end of the protection module is connected to the reverse power supply provided by the power access module, and the other end of the protection module is connected to an output end of the power consumption module; and the protection module is configured to, after a control circuit fails, disconnect the power consumption module to implement protection.

Further, the voltage step-down module includes:

a first voltage dividing and current limiting module, a second voltage dividing and current limiting module, a first switch tube, a first voltage regulator module, a capacitor C1, a first energy storage module, and a first fuse, where an input end of the first voltage dividing and current limiting module is the forward input end of the voltage step-down module and is connected to an input end of the second voltage dividing and current limiting module, an output end of the first voltage dividing and current limiting module is connected to an input end of the first switch tube, an output end of the second voltage dividing and current limiting module is connected to a control end of the first switch tube, an output end of the first switch tube is the output end of the voltage step-down module and is connected to an input end of the first energy storage module, an output end of the first energy storage module is grounded, the control end of the first switch tube is also connected to one end of the capacitor C1 and a high-potential end of the first voltage regulator module, and the other end of the capacitor C1 and a low-potential end of the voltage regulator module are both grounded, one end of the first fuse is the reverse input end of the voltage step-down module, and the other end of the first fuse is grounded.

Still further, the control module includes:

a resistor R21, a resistor R22, a resistor R23, a resistor R24, a resistor R25, a resistor R26, a capacitor C22, a capacitor C23, a capacitor C24, a capacitor C25, and a pulse generating module, where one end of the resistor R21 is the power supply end of the control module, the other end of the resistor R21 is connected to a discharge end of the pulse generating module through the resistor R22, a power supply end of the pulse generating module is also the power supply end of the control module and is connected to a ground end of the control module through the capacitor C24, a ground end of the pulse generating module is grounded, the discharge end of the pulse generating module is connected to a threshold control end of the pulse generating module through the resistor R23, the threshold control end of the pulse generating module is grounded through the capacitor C22, a control end of the pulse generating module is grounded through the capacitor C23, a reset end of the pulse generating module is grounded through the capacitor C25, the reset end of the pulse generating module is also connected to the power supply end of the pulse generating module through the resistor R26, an output end of the pulse generating module is connected to the power supply end of the pulse generating module through the resistor R24, the output end of the pulse generating module is also connected to one end of the resistor R25, the other end of the resistor R25 is the output end of the control module, and a trigger end of the pulse generating module is grounded.

Still further, the power consumption module includes:

a resistor R31, a resistor R32, a resistor R33, a resistor R34, a resistor R35, a power consumption component, a second switch tube, a third switch tube, and a second voltage regulator module, where an input end of the second switch tube is the first power supply end of the power consumption module and is connected to one end of the resistor R31, the other end of the resistor R31 is the control end of the power consumption module and is connected to a control end of the second switch tube through the resistor R32, an output end of the second switch tube is connected to a high-potential end of the second voltage regulator module through the resistor R33, a low-potential end of the second voltage regulator module is the output end of the power consumption module, the high-potential end of the second voltage regulator module is also connected to one end of the resistor R34 and one end of the resistor R35, the other end of the resistor R34 is also connected to the low-potential end of the second voltage regulator module and an output end of the third switch tube, the other end of the resistor R35 is connected to a control end of the third switch tube, an input end of the third switch tube is connected to one end of the power consumption component, and the other end of the power consumption component is the second power supply end of the power consumption module.

Still further, the protection module includes:

a resistor R41, a second fuse, and a third fuse, where one end of the second fuse is one end of the protection module, the other end of the second fuse is connected to one end of the third fuse, the other end of the third fuse is the other end of the protection module, and the resistor R41 and the third fuse are connected in parallel.

Still further, the alarm circuit further includes:

a monitoring module, where an input end of the monitoring module is connected to an output end of one or more of the power consumption modules, one or more power supply ends of the monitoring module are connected to a forward power supply provided by one or more power access modules, and an output end of the monitoring module is a monitoring output end of the alarm circuit; and the monitoring module is configured to monitor the alarm blowing current to output monitoring information.

Still further, the monitoring module includes:

a resistor R51, a resistor R52, a resistor R53, a resistor R54, a resistor R55, a resistor R56, a resistor R57, a capacitor C51, a capacitor C52, a fourth fuse, a fifth fuse, a first optical coupler, a second optical coupler, a fourth voltage dividing and current limiting module, and a fifth voltage dividing and current limiting module, where one end of the resistor R51 is a power supply end of the monitoring module and is connected to one end of the fourth voltage dividing and current limiting module, one end of the fourth fuse is the input end of the monitoring module, one end of the fourth fuse is connected to the other end of the resistor R51, the other end of the fourth voltage dividing and current limiting module is connected to the other end of the resistor R51 through the capacitor C51, the resistor R52 and the capacitor C51 are connected in parallel, the other end of the fourth voltage dividing and current limiting module is connected to an anode of the first optical coupler, a cathode of the first optical coupler is connected to the other end of the fourth fuse, a collector of the first optical coupler is the output end of the monitoring module and is connected to a +5V voltage through the resistor R53, an emitter of the first optical coupler is connected to a collector of the second optical coupler, an emitter of the second optical coupler is grounded through the resistor R57, one end of the resistor R54 is the other power supply end of the monitoring module and is connected to one end of the fifth voltage dividing and current limiting module, one end of the fifth fuse is the input end of the monitoring module, the other end of the fifth fuse is connected to the other end of the resistor R54, the other end of the fifth voltage dividing and current limiting module is connected to the other end of the fifth fuse through the capacitor C52, the resistor R56 and the capacitor C52 are connected in parallel, an anode of the second optical coupler is connected to the other end of the fifth voltage dividing and current limiting module, and a cathode of the second optical coupler is connected to the other end of the fifth fuse.

Still further, the alarm circuit further includes:

an alarm prompt module, where an input end of the alarm prompt module is connected to the output end of the monitoring module, and the alarm prompt module is configured to send an alarm prompt out according to the monitoring information.

Still further, the alarm prompt module includes:

a resistor R61, a resistor R62, a resistor R63, a resistor R64, a first NOT gate, a second NOT gate, a third NOT gate, a first light emitting diode, and a second light emitting diode, where one end of the resistor R61 is the input end of the alarm prompt module, the other end of the resistor R61 is connected to an input end of the first NOT gate, an output end of the first NOT gate is connected to a cathode of the first light emitting diode through the resistor R62, an anode of the first light emitting diode and an anode of the second light emitting diode are both connected to a +5V voltage, one end of the resistor R64 is also the input end of the alarm prompt module and is connected to an input end of the second NOT gate, an output end of the second NOT gate is connected to an input end of the third NOT gate, and an output end of the third NOT gate is connected to a cathode of the second light emitting diode through the resistor R63.

Still further, the alarm circuit further includes:

a reporting module, where an input end of the reporting module is connected to the output end of the monitoring module, and an output end of the reporting module is connected to an upper computer; and the reporting module is configured to provide the monitoring information for the upper computer.

Still further, the reporting module includes:

a resistor R71, a resistor R72, a capacitor C71, a fourth NAND gate, and a fifth NAND gate, where one end of the resistor R71 is the input end of the reporting module, the other end of the resistor R71 is connected to an input end of the fourth NAND gate, an output end of the fourth NAND gate is connected to an input end of the fifth NAND gate, an output end of the fifth NAND gate is grounded through the capacitor C71, the output end of the fifth NAND gate is also connected to one end of the resistor R57, and the other end of the resistor R57 is the output end of the reporting module.

Another objective of the embodiments of the present invention is to provide a power supply fuse alarm apparatus that uses the foregoing alarm circuit.

According to the embodiments of the present invention, an alarm blowing current is generated according to a pulse control signal, so that the alarm blowing current serves as a virtual load to blow an alarm fuse by using the alarm blowing current to implement an alarm prompt after a main fuse is blown. Moreover, because the pulse control signal is used to control connection and disconnection of a power consumption module, heat generated by power consumption is reduced significantly, and an area of a fuse alarm apparatus is reduced effectively.

DESCRIPTION OF EMBODIMENTS

To make the objectives, technical solutions, and advantages of the present invention clearer, the following describes the present invention in further detail with reference to the accompanying drawings and embodiments. It should be understood that the described specific embodiments are merely intended for explaining the present invention rather than limiting the present invention.

According to embodiments of the present invention, an alarm blowing current is generated according to a pulse control signal, so that the alarm blowing current serves as a virtual load to blow an alarm fuse by using the alarm blowing current to implement an alarm prompt after a main fuse is blown. Moreover, because the pulse control signal is used to control connection and disconnection of a power consumption module, heat generated by power consumption is reduced significantly, and an area of a fuse alarm apparatus is reduced effectively.

A power supply fuse alarm circuit provided in an embodiment of the present invention includes multiple groups of alarm units, where a forward input end and a reverse input end of each of the alarm units are connected to a power access module of multiple combined paths, and each of the alarm units includes:

a voltage step-down module, where a forward input end of the voltage step-down module is the forward input end of the alarm unit and is connected to a forward power supply provided by the power access module, and a reverse input end of the voltage step-down module is the reverse input end of the alarm unit and is connected to a reverse power supply provided by the power access module; and the voltage step-down module is configured to perform step-down processing on a voltage provided by the power access module, to output a working voltage applicable to the alarm circuit;

a control module, where a power supply end of the control module is connected to an output end of the voltage step-down module, and the control module is configured to output a pulse control signal with a certain duty cycle in a case of normal power supply;

a power consumption module, where a first power supply end of the power consumption module is connected to the output end of the voltage step-down module, a second power supply end of the power consumption module is connected to the forward power supply provided by the power access module, and a control end of the power consumption module is connected to an output end of the control module; and the power consumption module is configured to generate an alarm blowing current according to the pulse control signal, so that the alarm blowing current serves as a virtual load to blow an alarm fuse by using the alarm blowing current after a main fuse is blown; and a protection module, where one end of the protection module is connected to the reverse power supply provided by the power access module, and the other end of the protection module is connected to an output end of the power consumption module; and the protection module is configured to, after a control circuit fails, disconnect the power consumption module to implement protection.

According to the embodiment of the present invention, an alarm blowing current is generated according to a pulse control signal, so that the alarm blowing current serves as a virtual load to blow an alarm fuse by using the alarm blowing current to implement an alarm prompt after a main fuse is blown. Moreover, because the pulse control signal is used to control connection and disconnection of a power consumption module, heat generated by power consumption is reduced significantly, and an area of a fuse alarm apparatus is reduced effectively.

Figure 2:
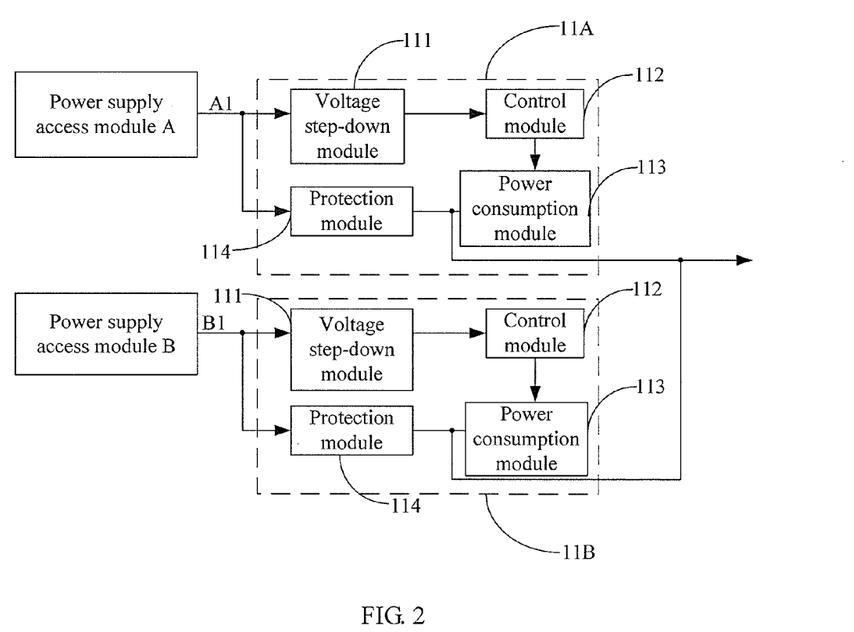
FIG. 2 is a structural diagram of a power supply fuse alarm circuit according to an embodiment of the present invention.

FIG. 2 shows a structure of a power supply fuse alarm circuit according to an embodiment of the present invention. For ease of description, only parts related to the present invention are shown.

The embodiment of the present invention is described by using dual-combined-path power supply as an example. Definitely, the embodiment of the present invention is not limited to an alarm for the dual-combined-path power supply. When the embodiment of the present invention is applied to multiple power supply loops, multiple alarm units may be connected to multiple power access modules correspondingly.

As an embodiment of the present invention, the power supply fuse alarm circuit 1 includes an alarm unit 11A and an alarm unit 11B, which are connected to a power access module A and a power access module B, respectively. Each of the alarm units includes:

a voltage step-down module 111, where a forward input end of the voltage step-down module 111 is connected to a forward power supply RTN provided by the power access module, and a reverse input end of the voltage step-down module 111 is connected to a reverse power supply −48V1 provided by the power access module; and the voltage step-down module 111 is configured to perform step-down processing on a voltage provided by the power access module, to output a working voltage applicable to the alarm circuit (a control module 112 and a power consumption module 113);

the control module 112, where a power supply end of the control module 112 is connected to an output end of the voltage step-down module 111, and the control module 112 is configured to output a pulse control signal with a certain duty cycle in a case of normal power supply;

the power consumption module 113, where a first power supply end of the power consumption module 113 is connected to the output end of the voltage step-down module 111, a second power supply end of the power consumption module 113 is connected to the forward power supply RTN provided by the power access module, and a control end of the power consumption module 113 is connected to an output end of the control module 112; and the power consumption module 113 is configured to generate an alarm blowing current according to the pulse control signal, so that the alarm blowing current serves as a virtual load to blow an alarm fuse by using the alarm blowing current after a main fuse is blown; and a protection module 114, where one end of the protection module 114 is connected to the reverse power supply −48V1 provided by the power access module, and the other end of the protection module 114 is connected to an output end of the power consumption module 113; and the protection module 114 is configured to, after a control circuit fails, disconnect the power consumption module 113 to implement protection.

In the embodiment of the present invention, when the alarm circuit works normally, the voltage step-down module 111 takes power from the power access module, converts the power into a working voltage that can be used by the alarm circuit (the control module 112 and the power consumption module 113). After the control module 112 is powered on to work, the control module 112 outputs a pulse control signal with a certain duty cycle, controls connection and disconnection time of the power consumption module 113, and enables the power consumption module to generate a pulse current. After a main fuse of a power supply loop A1 or B1 is blown, because an alarm fuse cannot bear strength of the pulse current independently, the current (the alarm blowing current) blows an alarm fuse corresponding to the power supply loop A1 or B1, to give an alarm indication, thereby implementing an alarm indication in a multiple-combined-path power supply scenario.

After the control module 112 fails, the protection module 114 can rapidly cut off the alarm blowing current to protect a PCB board for safety and avoid that the PCB board is too hot to burn out a component and even affect running of an entire system due to a too large alarm blowing current.

Moreover, compared with the prior art in which a constant current is used in a single path to blow an alarm fuse, in this implementation solution, a pulse current is used to blow an alarm fuse, which significantly reduces power consumption of the power consumption module 113, and further reduces dissipated heat and greatly reduces a size of a PCB board.

Understandably, the duty cycle of the pulse control signal may be adjusted according to an actual requirement to adjust power consumption of the alarm circuit.

Figure 3:
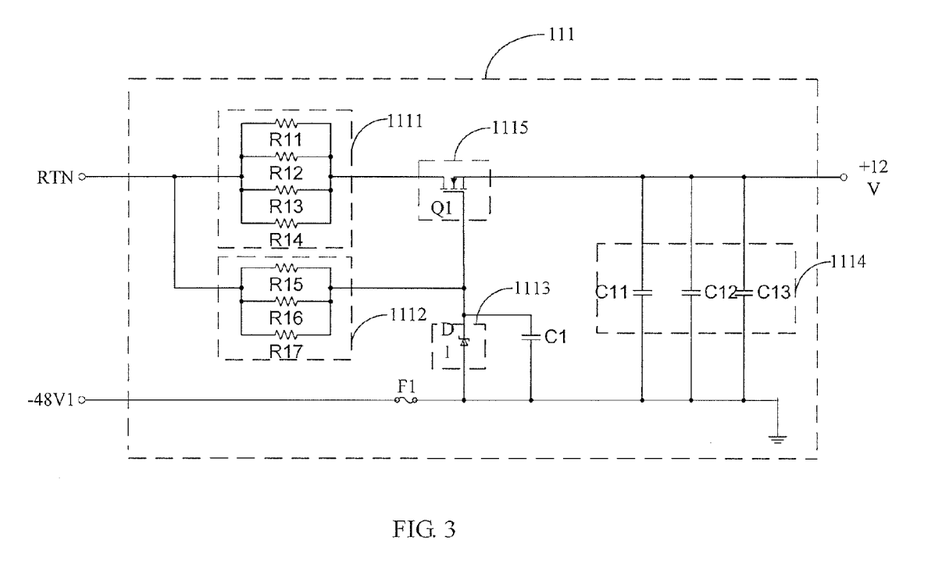
FIG. 3 is an exemplary circuit diagram of a voltage step-down module in a power supply fuse alarm circuit according to an embodiment of the present invention.
Figure 4:
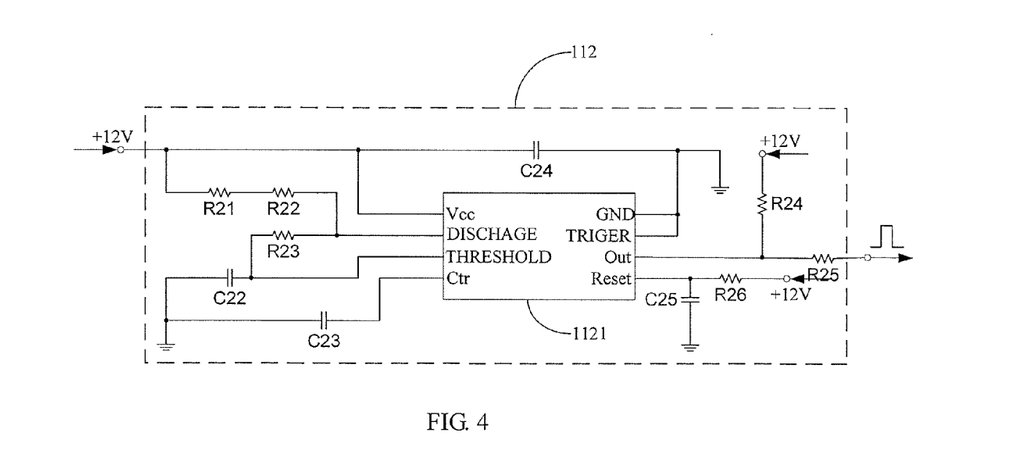
FIG. 4 is an exemplary circuit diagram of a control module in a power supply fuse alarm circuit according to an embodiment of the present invention.
Figure 5:
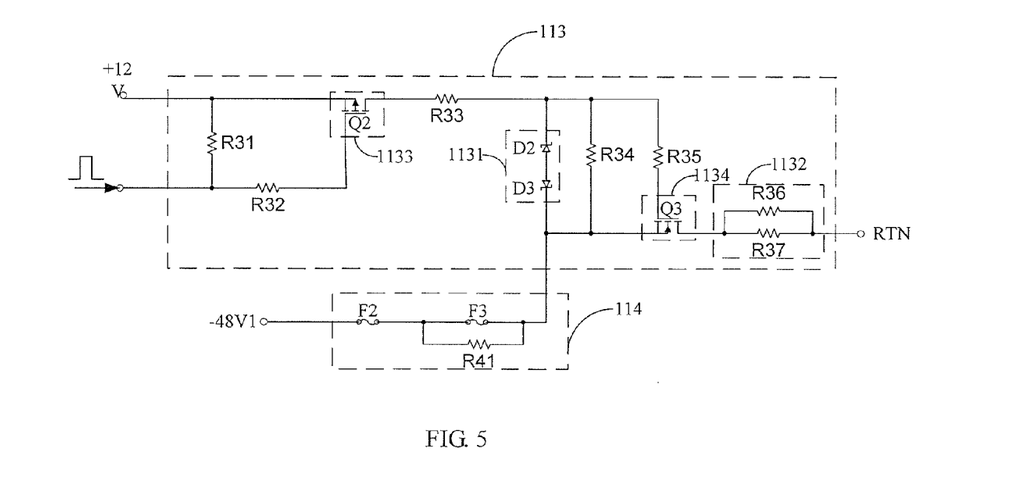
FIG. 5 is an exemplary circuit diagram of a power consumption module and a protection module in a power supply fuse alarm circuit according to an embodiment of the present invention.

FIG. 3, FIG. 4, and FIG. 5 show exemplary circuits of a voltage step-down module, a control module, a power consumption module, and a protection module in a power supply fuse alarm circuit according to an embodiment of the present invention. For ease of description, only parts related to the present invention are shown.

As an embodiment of the present invention, referring to FIG. 3, the voltage step-down module 111 includes:

a first voltage dividing and current limiting module 1111, a second voltage dividing and current limiting module 1112, a first voltage regulator module 1113, a capacitor C1, a first energy storage module 1114, a first switch tube 1115, and a first fuse F1.

An input end of the first voltage dividing and current limiting module 1111 is the forward input end of the voltage step-down module 111 (the forward input end of the voltage step-down module 111 is connected to the forward power supply RTN provided by the power access module) and is connected to an input end of the second voltage dividing and current limiting module 1112, an output end of the first voltage dividing and current limiting module 1111 is connected to an input end of the first switch tube 1115, an output end of the second voltage dividing and current limiting module 1112 is connected to a control end of the first switch tube 1115, an output end of the first switch tube 1115 is the output end of the voltage step-down module 111 and is connected to an input end of the first energy storage module 1114, an output end of the first energy storage module 1114 is grounded, the control end of the first switch tube 1115 is also connected to one end of the capacitor C1 and a high-potential end of the first voltage regulator module 1113, and the other end of the capacitor C1 and a low-potential end of the first voltage regulator module 1113 are both grounded, one end of the first fuse F1 is the reverse input end of the voltage step-down module 111 and is connected to the reverse power supply −48V1 provided by the power access module, and the other end of the first fuse F1 is grounded.

As an embodiment of the present invention, the first voltage dividing and current limiting module 1111 may specifically include:

a resistor R11, a resistor R12, a resistor R13, and a resistor R14, where the resistor R11, the resistor R12, the resistor R13, and the resistor R14 are in a parallel-connected structure, one end of the parallel connection is the input end of the first voltage dividing and current limiting module 1111, and the other end of the parallel connection is the output end of the first voltage dividing and current limiting module 1111.

The second voltage dividing and current limiting module 1112 may specifically include:

a resistor R15, a resistor R16, and a resistor R17, where the resistor R15, the resistor R16, and the resistor R17 are in a parallel-connected structure, one end of the parallel connection is the input end of the second voltage dividing and current limiting module 1112, and the other end of the parallel connection is the output end of the second voltage dividing and current limiting module 1112.

The first voltage regulator module 1113 may be implemented by using a voltage regulator diode D1. A cathode of the voltage regulator diode D1 is the high-potential end of the first voltage regulator module 1113, and an anode of the voltage regulator diode D1 is the low-potential end of the first voltage regulator module 1113.

The first energy storage module 1114 may specifically include:

a capacitor C11, a capacitor C12, and a capacitor C13, where the capacitor C11, the capacitor C12, and the capacitor C13 are in a parallel-connected structure, one end of the parallel connection is the input end of the first energy storage module 1114, and the other end of the parallel connection is the output end of the first energy storage module 1114.

The first switch tube 1115 may be an N-type MOS tube Q1. A drain electrode of the N-type MOS tube Q1 is the input end of the first switch tube 1115, a source electrode of the N-type MOS tube Q1 is the output end of the first switch tube 1115, and a gate electrode of the N-type MOS tube Q1 is the control end of the first switch tube 1115.

The first switch tube 1115 may also be an NPN-type triode, where a collector of the NPN-type triode is the input end of the first switch tube 1115, an emitter of the NPN-type triode is the output end of the first switch tube 1115, and a base of the NPN-type triode is the control end of the first switch tube 1115.

In the embodiment of the present invention, the voltage step-down module 111 may be implemented by using a series-connection voltage regulator circuit, so as to reduce noise and a ripple and improve stability.

The first switch tube 1115 extracts current from the power access module by using the first voltage dividing and current limiting module 1111 and the second voltage dividing and current limiting module 1112, and charges the first energy storage module 1114, so as to implement step-down transformation and stabilize an input wide voltage range [38.4V, 72V] at +12V to provide a working voltage for the control module 112 and the power supply fuse alarm circuit.

Referring to FIG. 4, the control module 112 includes:

a resistor R21, a resistor R22, a resistor R23, a resistor R24, a resistor R25, a resistor R26, a capacitor C22, a capacitor C23, a capacitor C24, a capacitor C25, and a pulse generating module 1121.

One end of the resistor R21 is the power supply end of the control module 112, the other end of the resistor R21 is connected to a discharge (DISCHAGE) end of the pulse generating module 1121 through the resistor R22, a power supply end (Vcc) of the pulse generating module 1121 is also the power supply end of the control module 112 and is connected to a ground end of the control module 112 through the capacitor C24, a ground end (GND) of the pulse generating module 1121 is grounded, the discharge end (DISCHAGE) of the pulse generating module 1121 is connected to a threshold end (THRESHOLD) of the pulse generating module 1121 through the resistor R23, the threshold end (THRESHOLD) of the pulse generating module 1121 is grounded through the capacitor C22, a control end (Ctr) of the pulse generating module 1121 is grounded through the capacitor C23, a reset end (Reset) of the pulse generating module 1121 is grounded through the capacitor C25, the reset end of the pulse generating module 1121 is also connected to the power supply end of the pulse generating module 1121 through the resistor R26, an output end (Out) of the pulse generating module 1121 is connected to the power supply end of the pulse generating module 1121 through the resistor R24, the output end of the pulse generating module 1121 is also connected to one end of the resistor R25, the other end of the resistor R25 is the output end of the control module 112, and a trigger end (TRIGER) of the pulse generating module 1121 is grounded.

As an embodiment of the present invention, the pulse generating module 1121 may be implemented by using a combination of discrete devices or may be implemented by using an integrated timer, such as a 555 timer.

Multiple resistors and capacitors are an application of the 555 timer, and details are not repeatedly described herein.

In a normal power supply scenario (such as a +12V working voltage), after the pulse generating module 1121 is powered on to work, the pulse generating module 1121 outputs a pulse signal through the output end as a control signal to control connection and disconnection time of the power consumption module 113, so as to reduce power consumption of the power consumption module 113, reduce dissipated heat, and reduce an area of a board.

After a main fuse of the board is blown, the voltage step-down module 111 cannot provide a working voltage for the control module 112, and the control module 112 fails. The output pulse signal with a certain duty cycle changes to a constantly-on high-level signal. A second fuse F2 or a third fuse F3 in the protection module 114 is blown immediately, so as to cut off power supply of the power consumption module 113 to implement protection.

Referring to FIG. 5, the power consumption module 113 includes:

a resistor R31, a resistor R32, a resistor R33, a resistor R34, a resistor R35, a second voltage regulator module 1131, a power consumption component 1132, a second switch tube 1133, and a third switch tube 1134.

An input end of the second switch tube 1133 is the first power supply end (which receives a +12V voltage provided by the voltage step-down module 111) of the power consumption module 113 and is connected to one end of the resistor R31, the other end of the resistor R31 is the control end of the power consumption module 113 and is connected to a control end of the second switch tube 1133 through the resistor R32, an output end of the second switch tube 1133 is connected to a high-potential end of the second voltage regulator module 1131 through the resistor R33, a low-potential end of the second voltage regulator module 1131 is the output end of the power consumption module 113, the high-potential end of the second voltage regulator module 1131 is also connected to one end of the resistor R34 and one end of the resistor R35, the other end of the resistor R34 is also connected to the low-potential end of the second voltage regulator module 1131 and an output end of the third switch tube 1134, the other end of the resistor R35 is connected to a control end of the third switch tube 1134, an input end of the third switch tube 1134 is connected to one end of the power consumption component 1132, and the other end of the power consumption component 1132 is the second power supply end of the power consumption module 113 and is connected to the forward power supply RTN provided by the power access module.

As an embodiment of the present invention, the second voltage regulator module 1131 includes a voltage regulator diode D2 and a voltage regulator diode D3. A cathode of the voltage regulator diode D2 is a high-potential end of the second voltage regulator module 1131, an anode of the voltage regulator diode D2 is connected to an anode of the voltage regulator diode D3, and a cathode of the voltage regulator diode D3 is a low-potential end of the second voltage regulator module 1131.

The power consumption component 1132 includes a resistor R36 and a resistor R37, where the resistor R36 and the resistor R37 are connected in parallel. A common end of the parallel connection is one end of the power consumption component 1132, and the other common end of the parallel connection is the other end of the power consumption component 1132.

The second switch tube 1133 may be a P-type MOS tube Q2. A source electrode of the P-type MOS tube Q2 is the input end of the second switch tube 1133, a drain electrode of the P-type MOS tube Q2 is the output end of the second switch tube 1133, and a gate electrode of the P-type MOS tube Q2 is the control end of the second switch tube 1133.

The second switch tube 1133 may also be a PNP-type triode, where an emitter of the NPN-type triode is the input end of the second switch tube 1133, a collector of the NPN-type triode is the output end of the second switch tube 1133, and a base of the NPN-type triode is the control end of the second switch tube 1133.

The third switch tube 1134 may be an N-type MOS tube Q3. A drain electrode of the N-type MOS tube Q3 is the input end of the third switch tube 1134, a source electrode of the N-type MOS tube Q3 is the output end of the third switch tube 1134, and a gate electrode of the N-type MOS tube Q3 is the control end of the third switch tube 1134.

The third switch tube 1134 may also be an NPN-type triode, where a collector of the NPN-type triode is the input end of the third switch tube 1134, an emitter of the NPN-type triode is the output end of the third switch tube 1134, and a base of the NPN-type triode is the control end of the third switch tube 1134.

The second switch tube 1133 and the third switch tube 1134 serve as control switches. When the pulse control signal is a low level, the second switch tube 1133 is turned on to control the third switch tube 1134 to be turned on, so as to generate an alarm blowing current.

The protection module 114 may implement blowing by using a fuse.

To enhance reliability, the protection module 114 may also implement blowing by using multiple fuses.

As a preferred embodiment of the present invention, the protection module 114 may further include:

a resistor R41, a second fuse F2, and a third fuse F3.

One end of the second fuse F2 is one end of the protection module 114 and is connected to the reverse power supply −48V1 provided by the power access module, the other end of the second fuse F2 is connected to one end of the third fuse F3, the other end of the third fuse F3 is the other end of the protection module 114, and the resistor R41 and the third fuse F3 are connected in parallel.

After the control module 112 fails, a constantly-on high-level signal is output, so that an alarm blowing current of the power consumption module 113 is too large. By blowing the second fuse F2 or the third fuse F3, the protection module 114 cuts off the alarm blowing current to protect a circuit for safety.

A higher order of magnitude may be selected for the second fuse F2, and a lower order of magnitude may be selected for the third fuse F3. The resistor R41 may properly reduce the alarm blowing current after the third fuse F3 is blown. The second fuse F2 does not need to be blown, and the alarm circuit can work normally.

Figure 6:
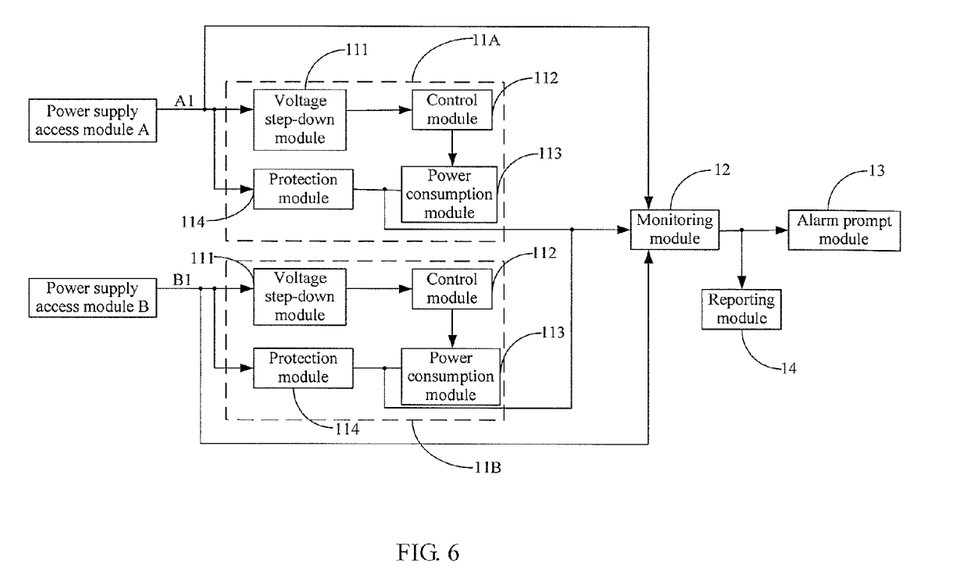
FIG. 6 is a preferred structural diagram of a power supply fuse alarm circuit according to an embodiment of the present invention.

As an embodiment of the present invention, the alarm circuit 1 may further include a monitoring module 12. Referring to FIG. 6, an input end of the monitoring module 12 is connected to an output end of one or more power consumption modules 113, one or more power supply ends of the monitoring module 12 are connected to a forward power supply RTN provided by one or more power access modules, and an output end of the monitoring module 12 is a monitoring output end of the alarm circuit 1; and the monitoring module 12 is configured to monitor the alarm blowing current to output monitoring information.

Figure 7:
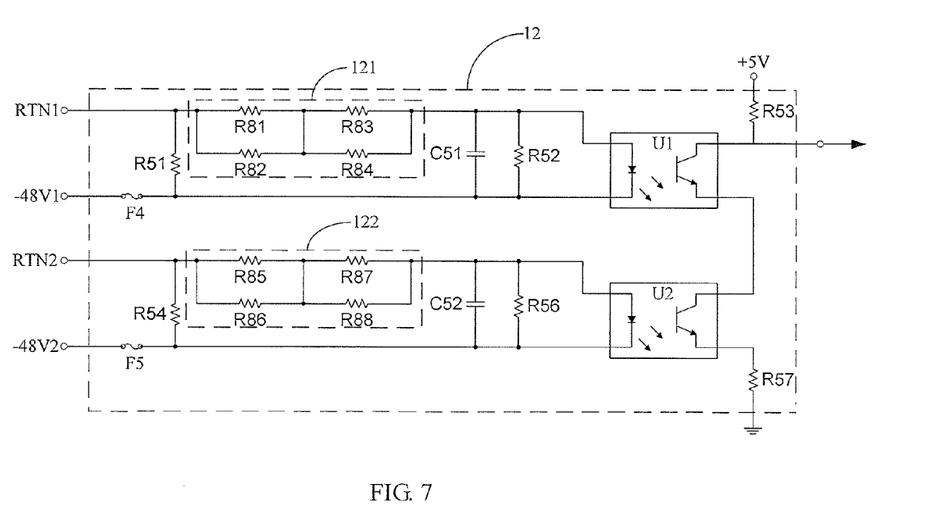
FIG. 7 is an exemplary circuit diagram of a monitoring module in a power supply fuse alarm circuit according to an embodiment of the present invention.

Preferably, an exemplary structure of a circuit of the monitoring module 12, referring to FIG. 7, includes:

a resistor R51, a resistor R52, a resistor R53, a resistor R54, a resistor R55, a resistor R56, a resistor R57, a capacitor C51, a capacitor C52, a fourth fuse F4, a fifth fuse F5, a first optical coupler U1, a second optical coupler U2, a fourth voltage dividing and current limiting module 121, and a fifth voltage dividing and current limiting module 122.

One end of the resistor R51 is a power supply end of the monitoring module 12 and is connected to a forward power supply RTN1 provided by a power access module A (with reference to FIG. 6), and is also connected to one end of the fourth voltage dividing and current limiting module 121, one end of the fourth fuse F4 is the input end of the monitoring module 12 and is connected to an output end (−48V1) of a power consumption module, one end of the fourth fuse F4 is connected to the other end of the resistor R51, the other end of the fourth voltage dividing and current limiting module 121 is connected to the other end of the resistor R51 through the capacitor C51, the resistor R52 and the capacitor C51 are connected in parallel, the other end of the fourth voltage dividing and current limiting module 121 is connected to an anode of the first optical coupler U1, a cathode of the first optical coupler U1 is connected to the other end of the fourth fuse F4, a collector of the first optical coupler U1 is the output end of the monitoring module 12 and is connected to a +5V voltage through the resistor R53, an emitter of the first optical coupler U1 is connected to a collector of the second optical coupler U2, an emitter of the second optical coupler U2 is grounded through the resistor R57, one end of the resistor R54 is the other power supply end of the monitoring module 12 and is connected to a forward power supply RTN2 provided by a power access module B (with reference to FIG. 6), and is also connected to one end of the fifth voltage dividing and current limiting module 122, one end of the fifth fuse F5 is the input end of the monitoring module 12 and is connected to an output end (−48V2) of another power consumption module, the other end of the fifth fuse F5 is connected to the other end of the resistor R54, the other end of the fifth voltage dividing and current limiting module 122 is connected to the other end of the fifth fuse F5 through the capacitor C52, the resistor R56 and the capacitor C52 are connected in parallel, an anode of the second optical coupler U2 is connected to the other end of the fifth voltage dividing and current limiting module 122, and a cathode of the second optical coupler U2 is connected to the other end of the fifth fuse F5.

As an embodiment of the present invention, the fourth voltage dividing and current limiting module 121 may include:

a resistor R81, a resistor R82, a resistor R83, and a resistor R84, where the resistor R81 and the resistor R82 are connected in parallel, a common end of the parallel connection is one end of the fourth voltage dividing and current limiting module 121, the other common end of the parallel connection of the resistor R81 and the resistor R82 is connected to one end of both the resistor R83 and the resistor R84, and the other common end of a parallel connection of the resistor R83 and the resistor R84 is the other end of the fourth voltage dividing and current limiting module 121.

The fifth voltage dividing and current limiting module 122 may include:

a resistor R85, a resistor R86, a resistor R87, and a resistor R88, where the resistor R85 and the resistor R86 are connected in parallel, a common end of the parallel connection is one end of the fifth voltage dividing and current limiting module 122, the other common end of the parallel connection of the resistor R85 and the resistor R86 is connected to one end of both the resistor R87 and the resistor R88, and the other common end of a parallel connection of the resistor R87 and the resistor R88 is the other end of the fifth voltage dividing and current limiting module 122.

In the embodiment of the present invention, the alarm blowing current charges the capacitor C51 and the capacitor C52. When any path of the alarm blowing current finishes charging the capacitor, a corresponding optical coupler is turned on to output monitoring information.

Definitely, the fourth fuse F4 and the fifth fuse F5 may be used to implement protection for the monitoring module 12 and prevent a too large current from damaging a circuit.

As an embodiment of the present invention, the alarm circuit 1 may further include:

an alarm prompt module 13, where, referring to FIG. 6, an input end of the alarm prompt module 13 is connected to the output end of the monitoring module 12, and the alarm prompt module 13 is configured to send an alarm prompt out according to the monitoring information.

Figure 8:
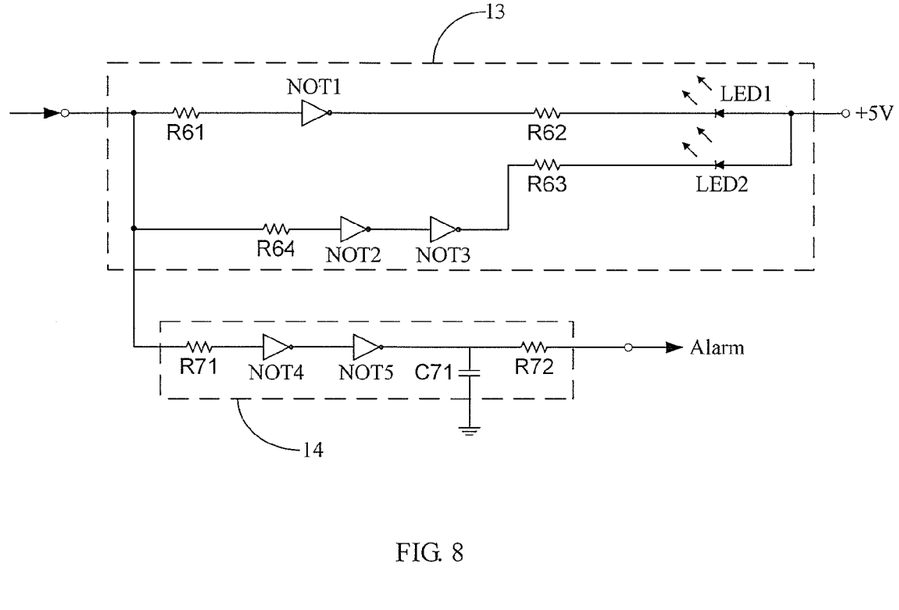
FIG. 8 is an exemplary circuit diagram of an alarm module and a reporting module in a power supply fuse alarm circuit according to an embodiment of the present invention.

Preferably, an exemplary structure of a circuit of the alarm prompt module 13, referring to FIG. 8, includes:

a resistor R61, a resistor R62, a resistor R63, a resistor R64, a first NOT gate NOT1, a second NOT gate NOT2, a third NOT gate NOT3, a first light emitting diode LED1, and a second light emitting diode LED2.

One end of the resistor R61 is the input end of the alarm prompt module 13, the other end of the resistor R61 is connected to an input end of the first NOT gate NOT1, an output end of the first NOT gate NOT1 is connected to a cathode of the first light emitting diode LED1 through the resistor R62, an anode of the first light emitting diode LED1 and an anode of the second light emitting diode LED2 are both connected to a +5V voltage, one end of the resistor R64 is also the input end of the alarm prompt module 13 and is connected to an input end of the second NOT gate NOT2, an output end of the second NOT gate NOT2 is connected to an input end of the third NOT gate NOT3, and an output end of the third NOT gate NOT3 is connected to a cathode of the second light emitting diode LED2 through the resistor R63.

In the embodiment of the present invention, an alarm prompt may be implemented by a light emitting diode or another power amplification circuit. For example, after monitoring information is received, the light emitting diode emits light or the power amplification circuit sends an alarm prompt tone out.

As an embodiment of the present invention, the alarm circuit 1 may further include:

a reporting module 14, where an input end of the reporting module 14 is connected to the output end of the monitoring module 12, and an output end of the reporting module 14 is connected to an upper computer; and the reporting module 14 is configured to provide monitoring information Alarm for the upper computer.

Preferably, an exemplary structure of a circuit of the reporting module 14, referring to FIG. 8, includes:

a resistor R71, a resistor R72, a capacitor C71, a fourth NAND gate NOT4, and a fifth NAND gate NOT5.

One end of the resistor R71 is the input end of the reporting module 14, the other end of the resistor R71 is connected to an input end of the fourth NAND gate NOT4, an output end of the fourth NAND gate NOT4 is connected to an input end of the fifth NAND gate NOT5, an output end of the fifth NAND gate NOT5 is grounded through the capacitor C71, the output end of the fifth NAND gate NOT5 is also connected to one end of the resistor R57, and the other end of the resistor R57 is the output end of the reporting module 14.

According to the embodiment of the present invention, an alarm blowing current is generated according to a pulse control signal, so that the alarm blowing current serves as a virtual load to blow an alarm fuse by using the alarm blowing current to implement an alarm prompt after a main fuse is blown. Moreover, because the pulse control signal is used to control connection and disconnection of a power consumption module, heat generated by power consumption is reduced significantly, and an area of a fuse alarm apparatus is reduced effectively.

The foregoing descriptions are merely exemplary embodiments of the present invention, but are not intended to limit the present invention. Any modification, equivalent replacement, and improvement made within the spirit and principle of the present invention shall all fall within the protection scope of the present invention.

What is claimed is:

1. A power supply fuse alarm circuit, wherein the alaini circuit comprises multiple groups of alarm units, a forward input end and a reverse input end of each of the alarm units are connected to a power access module of multiple combined paths, and each of the alarm units comprises:

a voltage step-down module, wherein a forward input end of the voltage step-down module is the forward input end of the alarm unit and is connected to a forward power supply provided by the power access module, and a reverse input end of the voltage step-down module is the reverse input end of the alarm unit and is connected to a reverse power supply provided by the power access module; and the voltage step-down module is configured to perform step-down processing on a voltage provided by the power access module, to output a working voltage applicable to the alarm circuit;

a control module, wherein a power supply end of the control module is connected to an output end of the voltage step-down module, and the control module is configured to output a pulse control signal with a certain duty cycle in a case of normal power supply;

a power consumption module, wherein a first power supply end of the power consumption module is connected to the output end of the voltage step-down module, a second power supply end of the power consumption module is connected to the forward power supply provided by the power access module, and a control end of the power consumption module is connected to an output end of the control module; and the power consumption module is configured to generate an alarm blowing current according to the pulse control signal, so that the alarm blowing current serves as a virtual load to blow an alarm fuse by using the alarm blowing current after a main fuse is blown; and a protection module, wherein one end of the protection module is connected to the reverse power supply provided by the power access module, and the other end of the protection module is connected to an output end of the power consumption module, and the protection module is configured to, after a control circuit fails, disconnect the power consumption module to implement protection.

2. The alarm circuit according to claim 1, wherein the voltage step-down module comprises:

a first voltage dividing and current limiting module, a second voltage dividing and current limiting module, a first switch tube, a first voltage regulator module, a first step-down capacitor, a first energy storage module, and a first fuse, wherein an input end of the first voltage dividing and current limiting module is the forward input end of the voltage step-down module and is connected to an input end of the second voltage dividing and current limiting module, an output end of the first voltage dividing and current limiting module is connected to an input end of the first switch tube, an output end of the second voltage dividing and current limiting module is connected to a control end of the first switch tube, an output end of the first switch tube is the output end of the voltage step-down module and is connected to an input end of the first energy storage module, an output end of the first energy storage module is grounded, the control end of the first switch tube is also connected to one end of the first step-down capacitor and a high-potential end of the first voltage regulator module, and the other end of the first step-down capacitor and a low-potential end of the voltage regulator module are both grounded, one end of the first fuse is the reverse input end of the voltage step-down module, and the other end of the first fuse is grounded.

3. The alarm circuit according to claim 1, wherein the control module comprises:

a first control module resistor, a second control module resistor, a third control module resistor, a fourth control module resistor, a fifth control module resistor, a sixth control module resistor, a first control module capacitor, a second control module capacitor, a third control module capacitor, a fourth control module capacitor, and a pulse generating module, wherein one end of the first control module resistor is the power supply end of the control module, the other end of the first control module resistor is connected to a discharge end of the pulse generating module through the second control module resistor, a power supply end of the pulse generating module is also the power supply end of the control module and is connected to a ground end of the control module through the third control module capacitor, a ground end of the pulse generating module is grounded, the discharge end of the pulse generating module is connected to a threshold control end of the pulse generating module through the third control module resistor, the threshold control end of the pulse generating module is grounded through the first control module capacitor, a control end of the pulse generating module is grounded through the second control module capacitor, a reset end of the pulse generating module is grounded through the fourth control module capacitor, the reset end of the pulse generating module is also connected to the power supply end of the pulse generating module through the sixth control module resistor, an output end of the pulse generating module is connected to the power supply end of the pulse generating module through the fourth control module resistor, the output end of the pulse generating module is also connected to one end of the fifth control module resistor, the other end of the fifth control module resistor is the output end of the control module, and a trigger end of the pulse generating module is grounded.

4. The alarm circuit according to claim 1, wherein the power consumption (PC) module comprises:

a first PC resistor, a second PC resistor, a third PC resistor, a fourth PC resistor, a fifth PC resistor, a power consumption component, a second switch tube, a third switch tube, and a second voltage regulator module, wherein an input end of the second switch tube is the first power supply end of the power consumption module and is connected to one end of the first PC resistor, the other end of the first PC resistor is the control end of the power consumption module and is connected to a control end of the second switch tube through the second PC resistor, an output end of the second switch tube is connected to a high-potential end of the second voltage regulator module through the third PC resistor, a low-potential end of the second voltage regulator module is the output end of the power consumption module, the high-potential end of the second voltage regulator module is also connected to one end of the fourth PC resistor and one end of the fifth PC resistor, the other end of the fourth PC resistor is also connected to the low-potential end of the second voltage regulator module and an output end of the third switch tube, the other end of the fifth PC resistor is connected to a control end of the third switch tube, an input end of the third switch tube is connected to one end of the power consumption component, and the other end of the power consumption component is the second power supply end of the power consumption module.

5. The alarm circuit according to claim 1, wherein the protection module comprises:

a protection module resistor, a second fuse, and a third fuse, wherein one end of the second fuse is one end of the protection module, the other end of the second fuse is connected to one end of the third fuse, the other end of the third fuse is the other end of the protection module, and the protection module resistor and the third fuse are connected in parallel.

6. The alarm circuit according to claim 1, wherein the alarm circuit further comprises:

a monitoring module, wherein an input end of the monitoring module is connected to an output end of one or more of the power consumption modules, one or more power supply ends of the monitoring module are connected to a forward power supply provided by one or more power access modules, and an output end of the monitoring module is a monitoring output end of the alarm circuit; and the monitoring module is configured to monitor the alarm blowing current to output monitoring information.

7. The alarm circuit according to claim 6, wherein the monitoring module comprises:

a first monitoring module resistor, a second monitoring module resistor, a third monitoring module resistor, a fourth monitoring module resistor, a fifth monitoring module resistor, a sixth monitoring module resistor, a seventh monitoring module resistor, a first monitoring module capacitor, a second monitoring module capacitor, a fourth fuse, a fifth fuse, a first optical coupler, a second optical coupler, a fourth voltage dividing and current limiting module, and a fifth voltage dividing and current limiting module, wherein one end of the first monitoring module resistor is a power supply end of the monitoring module and is connected to one end of the fourth voltage dividing and current limiting module, one end of the fourth fuse is the input end of the monitoring module, the other end of the fourth fuse is connected to the other end of the first monitoring module resistor, the other end of the fourth voltage dividing and current limiting module is connected to the other end of the first monitoring module resistor through the first monitoring module capacitor, the second monitoring module resistor and the first monitoring module capacitor are connected in parallel, the other end of the fourth voltage dividing and current limiting module is connected to an anode of the first optical coupler, a cathode of the first optical coupler is connected to the other end of the fourth fuse, a collector of the first optical coupler is the output end of the monitoring module and is connected to a +5V voltage through the resistor third monitoring module resistor, an emitter of the first optical coupler is connected to a collector of the second optical coupler, an emitter of the second optical coupler is grounded through the seventh monitoring module resistor, one end of the fourth monitoring module resistor is the other power supply end of the monitoring module and is connected to one end of the fifth voltage dividing and current limiting module, one end of the fifth fuse is the input end of the monitoring module, the other end of the fifth fuse is connected to the other end of the fourth monitoring module resistor, the other end of the fifth voltage dividing and current limiting module is connected to the other end of the fifth fuse through the second monitoring module capacitor, the sixth monitoring module resistor and the second monitoring module capacitor are connected in parallel, an anode of the second optical coupler is connected to the other end of the fifth voltage dividing and current limiting module, and a cathode of the second optical coupler is connected to the other end of the fifth fuse.

8. The alarm circuit according to claim 6, wherein the alarm circuit further comprises:
an alarm prompt module, wherein an input end of the alarm prompt module is connected to the output end of the monitoring module, and the alarm prompt module is configured to send an alarm prompt out according to the monitoring information.

9. The alarm circuit according to claim 8, wherein the alarm prompt (AP) module comprises:
a first AP resistor, a second AP resistor, a third AP resistor, a fourth AP resistor, a first NOT gate, a second NOT gate, a third NOT gate, a first light emitting diode, and a second light emitting diode, wherein
one end of the first AP resistor is the input end of the alarm prompt module, the other end of the first AP resistor is connected to an input end of the first NOT gate, an output end of the first NOT gate is connected to a cathode of the first light emitting diode through the second AP resistor, an anode of the first light emitting diode and an anode of the second light emitting diode are both connected to a +5V voltage, one end of the fourth AP resistor is also the input end of the alarm prompt module and is connected to an input end of the second NOT gate, an output end of the second NOT gate is connected to an input end of the third NOT gate, and an output end of the third NOT gate is connected to a cathode of the second light emitting diode through the third AP resistor.

10. The alarm circuit according to claim 6, wherein the alarm circuit further comprises:
a reporting module, wherein an input end of the reporting module is connected to the output end of the monitoring module, and an output end of the reporting module is connected to an upper computer; and the reporting module is configured to provide the monitoring information for the upper computer.

11. The alarm circuit according to claim 10, wherein the reporting module comprises:
a first reporting module resistor, a second reporting module resistor, a reporting module capacitor, a fourth NAND gate, and a fifth NAND gate, wherein
one end of the first reporting module resistor is the input end of the reporting module, the other end of the first reporting module resistor is connected to an input end of the fourth NAND gate, an output end of the fourth NAND gate is connected to an input end of the fifth NAND gate, an output end of the fifth NAND gate is grounded through the reporting module capacitor, the output end of the fifth NAND gate is also connected to one end of the second reporting module resistor, and the other end of the second reporting module resistor is the output end of the reporting module.

12. A power supply fuse alarm apparatus, wherein a power supply fuse alarm circuit in the alarm apparatus comprises multiple groups of alarm units, a forward input end and a reverse input end of each of the alarm units are connected to a power access module of multiple combined paths, and each of the alarm units comprises:
a voltage step-down module, wherein a forward input end of the voltage step-down module is the forward input end of the alarm unit and is connected to a forward power supply provided by the power access module, and a reverse input end of the voltage step-down module is the reverse input end of the alarm unit and is connected to a reverse power supply provided by the power access module; and the voltage step-down module is configured to perform step-down processing on a voltage provided by the power access module, to output a working voltage applicable to the alarm circuit;
a control module, wherein a power supply end of the control module is connected to an output end of the voltage step-down module, and the control module is configured to output a pulse control signal with a certain duty cycle in a case of normal power supply;
a power consumption module, wherein a first power supply end of the power consumption module is connected to the output end of the voltage step-down module, a second power supply end of the power consumption module is connected to the forward power supply provided by the power access module, and a control end of the power consumption module is connected to an output end of the control module; and the power consumption module is configured to generate an alarm blowing current according to the pulse control signal, so that the alarm blowing current serves as a virtual load to blow an alarm fuse by using the alarm blowing current after a main fuse is blown; and
a protection module, wherein one end of the protection module is connected to the reverse power supply provided by the power access module, and the other end of the protection module is connected to an output end of the power consumption module, and the protection module is configured to, after a control circuit fails, disconnect the power consumption module to implement protection.

13. The alarm apparatus according to claim 12, wherein the voltage step-down module comprises:
a first voltage dividing and current limiting module, a second voltage dividing and current limiting module, a first switch tube, a first voltage regulator module, a capacitor C1, a first energy storage module, and a first fuse, wherein an input end of the first voltage dividing and current limiting module is the forward input end of the voltage step-down module and is connected to an input end of the second voltage dividing and current limiting module, an output end of the first voltage dividing and current limiting module is connected to an input end of the first switch tube, an output end of the second voltage dividing and current limiting module is connected to a control end of the first switch tube, an output end of the first switch tube is the output end of the voltage step-down module and is connected to an input end of the first energy storage module, an output end of the first energy storage module is grounded, the control end of the first switch tube is also connected to one end of the capacitor C1 and a high-potential end of the first voltage regulator module, and the other end of the capacitor C1 and a low-potential end of the voltage regulator module are both grounded, one end of the first fuse is the reverse input end of the voltage step-down module, and the other end of the first fuse is grounded.

14. The alarm apparatus according to claim 12, wherein the control module comprises:

a first control module resistor, a second control module resistor, a third control module resistor, a fourth control module resistor, a fifth control module resistor, a sixth control module resistor, a first control module capacitor, a second control module capacitor, a third control module capacitor, a fourth control module capacitor, and a pulse generating module, wherein one end of the first control module resistor is the power supply end of the control module, the other end of the first control module resistor is connected to a discharge end of the pulse generating module through the second control module resistor, a power supply end of the pulse generating module is also the power supply end of the control module and is connected to a ground end of the control module through the third control module capacitor, a ground end of the pulse generating module is grounded, the discharge end of the pulse generating module is connected to a threshold control end of the pulse generating module through the third control module resistor, the threshold control end of the pulse generating module is grounded through the first control module capacitor, a control end of the pulse generating module is grounded through the second control module capacitor, a reset end of the pulse generating module is grounded through the fourth control module capacitor, the reset end of the pulse generating module is also connected to the power supply end of the pulse generating module through the sixth control module resistor, an output end of the pulse generating module is connected to the power supply end of the pulse generating module through the fourth control module resistor, the output end of the pulse generating module is also connected to one end of the fifth control module resistor, the other end of the fifth control module resistor is the output end of the control module, and a trigger end of the pulse generating module is grounded.

15. The alarm apparatus according to claim 12, wherein the power consumption (PC) module comprises:

a first PC resistor, a second PC resistor, a third PC resistor, a fourth PC resistor, a fifth PC resistor, a power consumption component, a second switch tube, a third switch tube, and a second voltage regulator module, wherein an input end of the second switch tube is the first power supply end of the power consumption module and is connected to one end of the first PC resistor, the other end of the first PC resistor is the control end of the power consumption module and is connected to a control end of the second switch tube through the second PC resistor, an output end of the second switch tube is connected to a high-potential end of the second voltage regulator module through the third PC resistor, a low-potential end of the second voltage regulator module is the output end of the power consumption module, the high-potential end of the second voltage regulator module is also connected to one end of the fourth PC resistor and one end of the fifth PC resistor, the other end of the fourth PC resistor is also connected to the low-potential end of the second voltage regulator module and an output end of the third switch tube, the other end of the fifth PC resistor is connected to a control end of the third switch tube, an input end of the third switch tube is connected to one end of the power consumption component, and the other end of the power consumption component is the second power supply end of the power consumption module.

16. The alarm apparatus according to claim 12, wherein the protection module comprises:

a protection module resistor, a second fuse, and a third fuse, wherein one end of the second fuse is one end of the protection module, the other end of the second fuse is connected to one end of the third fuse, the other end of the third fuse is the other end of the protection module, and the protection module resistor and the third fuse are connected in parallel.

17. The alarm apparatus according to claim 12, wherein the alarm circuit further comprises:

a monitoring module, wherein an input end of the monitoring module is connected to an output end of one or more of the power consumption modules, one or more power supply ends of the monitoring module are connected to a forward power supply provided by one or more power access modules, and an output end of the monitoring module is a monitoring output end of the alarm circuit;

and the monitoring module is configured to monitor the alarm blowing current to output monitoring information.

18. The alarm apparatus according to claim 17, wherein the monitoring module comprises:

a first monitoring module resistor, a second monitoring module resistor, a third monitoring module resistor, a fourth monitoring module resistor, a fifth monitoring module resistor, a sixth monitoring module resistor, a seventh monitoring module resistor, a first monitoring module capacitor, a second monitoring module capacitor, a fourth fuse, a fifth fuse, a first optical coupler, a second optical coupler, a fourth voltage dividing and current limiting module, and a fifth voltage dividing and current limiting module, wherein one end of the first monitoring module resistor is a power supply end of the monitoring module and is connected to one end of the fourth voltage dividing and current limiting module, one end of the fourth fuse is the input end of the monitoring module, the other end of the fourth fuse is connected to the other end of the first monitoring module resistor, the other end of the fourth voltage dividing and current limiting module is connected to the other end of the first monitoring module resistor through the first monitoring module capacitor, the second monitoring module resistor and the first monitoring module capacitor are connected in parallel, the other end of the fourth voltage dividing and current limiting module is connected to an anode of the first optical coupler, a cathode of the first optical coupler is connected to the other end of the fourth fuse, a collector of the first optical coupler is the output end of the monitoring module and is connected to a +5V voltage through the resistor third monitoring module resistor, an emitter of the first optical coupler is connected to a collector of the second optical coupler, an emitter of the second optical coupler is grounded through the seventh monitoring module resistor, one end of the fourth monitoring module resistor is the other power supply end of the monitoring module and is connected to one end of the fifth voltage dividing and current limiting module, one end of the fifth fuse is the input end of the monitoring module, the other end of the fifth fuse is connected to the other end of the fourth monitoring module resistor, the other end of the fifth voltage dividing and current limiting module is connected to the other end of the fifth fuse through the second monitoring module capacitor, the sixth monitoring module resistor and the second monitoring module capacitor are connected in parallel, an anode of the second optical coupler is connected to the other end of the fifth voltage dividing and current limiting module, and a cathode of the second optical coupler is connected to the other end of the fifth fuse.

19. The alarm apparatus according to claim 17, wherein the alarm circuit further comprises:
an alarm prompt module, wherein an input end of the alarm prompt module is connected to the output end of the monitoring module, and the alarm prompt module is configured to send an alarm prompt out according to the monitoring information.

20. The alarm apparatus according to claim 19, wherein the alarm prompt (AP) module comprises:
a first AP resistor, a second AP resistor, a third AP resistor, a fourth AP resistor, a first NOT gate, a second NOT gate, a third NOT gate, a first light emitting diode, and a second light emitting diode, wherein
one end of the first AP resistor is the input end of the alarm prompt module, the other end of the first AP resistor is connected to an input end of the first NOT gate, an output end of the first NOT gate is connected to a cathode of the first light emitting diode through the second AP resistor, an anode of the first light emitting diode and an anode of the second light emitting diode are both connected to a +5V voltage, one end of the fourth AP resistor is also the input end of the alarm prompt module and is connected to an input end of the second NOT gate, an output end of the second NOT gate is connected to an input end of the third NOT gate, and an output end of the third NOT gate is connected to a cathode of the second light emitting diode through the third AP resistor.

21. The alarm apparatus according to claim 17, wherein the alarm circuit further comprises:
a reporting module, wherein an input end of the reporting module is connected to the output end of the monitoring module, and an output end of the reporting module is connected to an upper computer; and the reporting module is configured to provide the monitoring information for the upper computer.

22. The alarm apparatus according to claim 21, wherein the reporting module comprises:
a first reporting module resistor, a second reporting module resistor, a reporting module capacitor, a fourth NAND gate, and a fifth NAND gate, wherein
one end of the first reporting module resistor is the input end of the reporting module, the other end of the first reporting module resistor is connected to an input end of the fourth NAND gate, an output end of the fourth NAND gate is connected to an input end of the fifth NAND gate, an output end of the fifth NAND gate is grounded through the reporting module capacitor, the output end of the fifth NAND gate is also connected to one end of the second reporting module resistor, and the other end of the second reporting module resistor is the output end of the reporting module.

* * * * *